M. P. HOLMES.
TRUCK.
APPLICATION FILED NOV. 8, 1917.
1,411,026.
Patented Mar. 28, 1922.
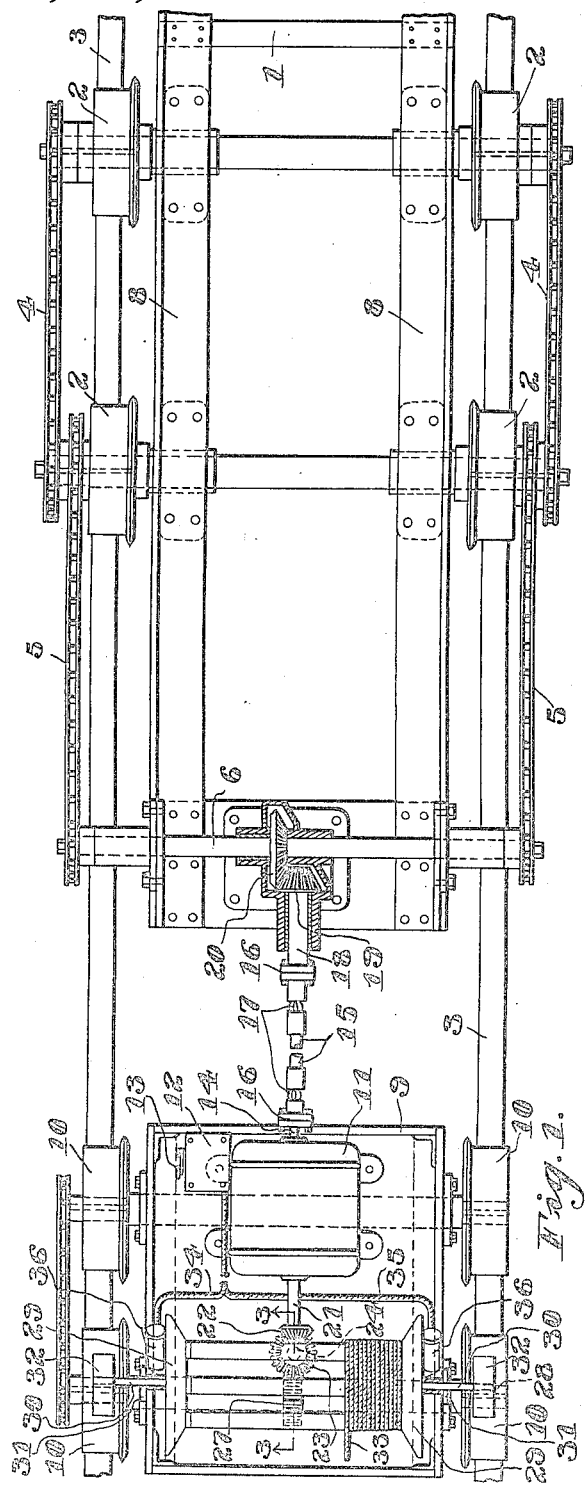
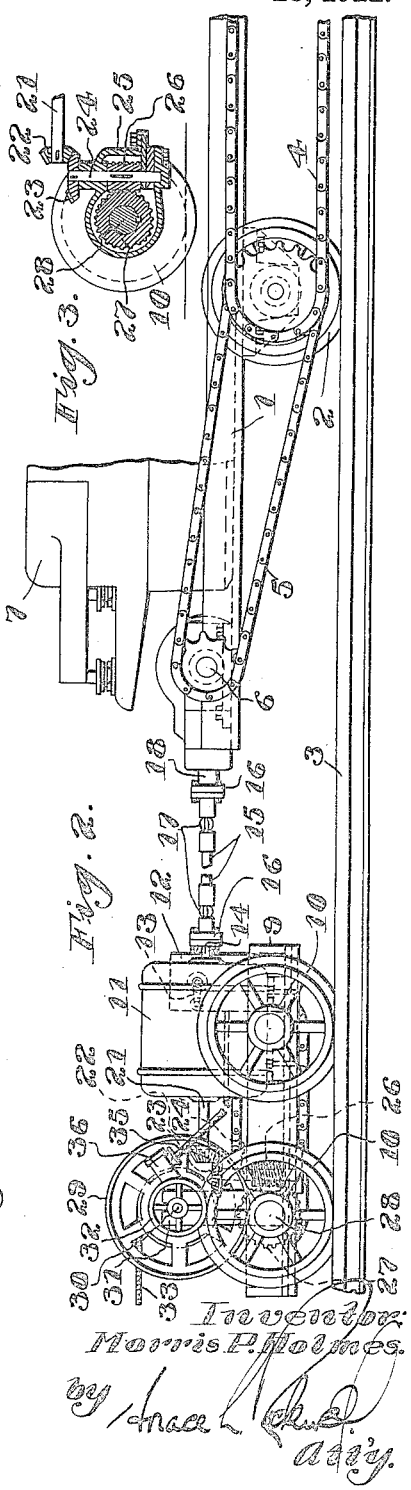
Inventor
Morris P. Holmes.

UNITED STATES PATENT OFFICE.

MORRIS P. HOLMES, OF CLAREMONT, NEW HAMPSHIRE, ASSIGNOR TO SULLIVAN MACHINERY COMPANY, A CORPORATION OF MASSACHUSETTS.

TRUCK.

1,411,026. Specification of Letters Patent. Patented Mar. 28, 1922.

Application filed November 8, 1917. Serial No. 200,899.

*To all whom it may concern:*

Be it known that I, MORRIS P. HOLMES, a citizen of the United States, residing at Claremont, in the county of Sullivan and State of New Hampshire, have invented certain new and useful Improvements in Trucks, of which the following is a full, clear, and exact specification.

My invention relates to trucks.

It has for its object to provide an improved self-propelled truck adapted to use in connection with the transport of a mining machine from place to place about the mine. A further object of my invention is to provide an improved truck, a portion of which is adapted to use as an independent self-propelled unit capable of being transported under its own power about the mine independently of the portion of the truck which carries the mining machine. A more specific object of my invention is to produce an improved truck wherein the mining machine is carried upon one element of the truck and the power for propelling this element is supplied from another element of the truck which is adapted to act as a transport for the cable reel and to be used as an independent self-propelled unit adapted to use for transport purposes when desired. These and other objects and advantages of my improved construction will hereinafter more fully appear.

In the accompanying drawings, I have shown for purposes of illustration one embodiment which my invention may assume in practice, illustrating the same as applied to use in connection with a mining machine of standard form.

In these drawings,—

Fig. 1 is a plan view, partially in section, of my improved truck.

Fig. 2 is a partial side elevation of the truck, a mining machine being shown in position upon an element thereof.

Fig. 3 is a detail sectional view taken on line 3—3 of Fig. 1.

In this illustrative construction, it will be noted that I have illustrated as one element a truck frame 1 of usual form mounted upon wheels 2 which are in turn adapted to move upon the track rails 3. As shown, these wheels 2 are driven through power connections, herein shown in the form of chain and sprocket connections 4 and 5, from a rotating shaft 6 disposed at the rear end of the truck frame. Upon this truck element 1 a mining machine 7 is adapted to be carried, the same being carried in the transport position shown in Fig. 2 on suitable guideways 8 so that the machine may be loaded or unloaded, as desired.

In my improved construction, it will be observed that the power for the truck 1 is derived from another source than the mining machine, a separate power unit being utilized which is connectable to the shaft 6 to propel the truck 1 and at the same time is adapted to be disconnected therefrom and propelled under its own power about the mine. As shown, this unit assumes the form of a separate truck herein in the form of a rearwardly located pony truck or trailer frame 9 mounted on wheels 10 and carrying a suitable motor 11 operatively connected to the shaft 6. In this illustrative form of my invention, this motor is shown to be an electric motor, the same preferably being of the series reversible type and adapted to be controlled by a suitable controller 12 through manipulation of the controller handle 13. Operatively connected to the armature shaft 14 of this motor and to the shaft 6, is a flexible driving connection. As shown, this connection includes a shaft 15 having suitable couplings 16 at its opposite ends and intermediate its ends a plurality of flexible joints 17, preferably disposed adjacent these couplings so that the desired flexible drive may be produced. As illustrated, the forward one of these couplings 16 acts to connect the driving connection 15 to a longitudinally disposed shaft 18 suitably journaled on the rear end of the truck 1 and having a beveled gear 19 on its front end meshing with a suitable correspondingly beveled gear 20 carried on the shaft 6. Thus, it will be observed that through the operation of the controller handle 13 the motor 11 may be operated to drive the shaft 6 upon the truck 1, both to regulate the speed thereof and cause a reversal of the truck movement, as desired.

In my improvement, I have also provided means whereby the motor 11 may drive the trailer wheels 10, these means preferably being so arranged that as the motor supplies power to the wheels of the truck 1 it will also supply power to the trailer wheels and thus instead of causing the truck 1 to drag a dead weight behind the same, make both elements active driving elements in the propulsion of the machine about the mine. As illustrated, these means include an extension 21 on the rear end of the armature shaft which in turn carries a beveled gear 22 meshing with a beveled gear 23 which is in turn carried on an upstanding shaft 24 journaled in a suitable bracket 25 formed on the trailer frame. As shown, this bracket carries at a point beneath the gear 23 a worm 26 meshing with a suitable worm gear 27 carried on the axle 28 of the rear trailer wheels 10. Thus, it will be observed that as the motor 11 supplies power to the shaft 6, the same also supplies power to the axle 28 and thus causes both elements comprising my improved truck to form live or propelling elements in the combination.

In a preferred form of my invention, the trailer frame 9 also acts as a transport frame for the conductor reel 29 which, as shown, is provided with a shaft 30 mounted in suitable supports 31 disposed at the opposite side of the frame and over the rear axle 28 so that by the provision of separate rollers or frictional driving elements 32 on the reel shaft 30, the rotation of these wheels 10 may be imparted to the reel shaft and thus to the reel 29 in such a manner as to cause the reel to be rotated to wind or unwind the usual cable 33 as the machine moves back and forth in the mine. Obviously, in this construction the cable will, as usual, be connectible through suitable connections 34 and 35 to the mining machine motor, and will also be connectible to the motor 11, suitable plugs 36 preferably being provided in each of these last mentioned connections.

In the operation of my improved mechanism, it will be observed that with the mining machine mounted upon the truck element 1 in the position shown in Fig. 2, the power for transporting the machine about the mine will be supplied from the motor 11 through the driving connection 15 and the gears 19 and 20 as well as the power connections including the extension 21 on the armature shaft and the gearing connections 22, 23, 26, and 27. Thus, is will be evident that through the movement of the controller handle 13 the operator is able to transport the machine into any desired position in the mine, the reel 29 being rotated automatically as the machine moves in either direction in such a manner as to maintain the current supply to the motor 11. Should, however, the operator, as for instance after the machine has been unloaded from its truck 1, desire to go to another part of the mine, or to send his helper to get new bits or the like, it is only necessary in my improved construction to disconnect one of the couplings 16, preferably that adjacent the motor 11, and then through the controller handle 13 start the trailer in movement as a separate self-propelled vehicle.

By the use of my improvement it will be noted that it is possible to utilize a very small motor during transport, as distinguished from the large motor necessarily provided upon the mining machine. For instance, a five horse-power motor upon the trailer is adapted to supply all the power necessary for transport purposes under normal conditions, as contrasted with the thirty to fifty horse-power motor which it is necessary to utilize when the truck is driven from the machine motor. It will also be observed that through the provision of my improvement it is possible to obtain ample traction due to the weight of the machine upon the wheels 2, and to eliminate practically all of the truck driving mechanism upon the machine carrying portion of the truck, at the same time that a separable self-propelled element having the controlling mechanism located conveniently thereon is provided, which is adapted to use independently of the mining machine for transport purposes when desired, as for instance in the transport of supplies or repairs to and from a given place, or in carrying the runner and his helper to and from the different places where the mining machine may be left at the end of the different shifts. These and other advantages of my improvement will, however, be clearly apparent to those skilled in the art.

While I have in this application specifically described one embodiment which my invention may assume in practice, it should be understood that this form of the same is shown only for purposes of illustration and that the invention may be modified and embodied in other forms without departing from its spirit or the scope of the appended claims.

What I claim as new and desire to secure by Letters Patent is:

1. The combination with a mining machine truck adapted to carry a motor driven mining machine thereon, of truck propelling means independent of the mining machine and truck and utilizing the weight of the same to increase the traction.

2. The combination with a mining machine truck adapted to carry a motor driven mining machine thereon, of an independently operable power truck therefor, and means driven thereby and independent of the mining machine for utilizing the weight of the latter to increase the traction.

3. The combination with a mining machine truck adapted to carry a motor driven mining machine thereon, of a pony truck operatively connectible with said truck, and means on said pony truck for propelling the wheels of said mining machine truck independently of the mining machine motor.

4. The combination with a mining machine truck adapted to carry a motor driven mining machine thereon, of a power truck operatively connectible with said truck, and propelling means on said power truck connectible at will to propel the wheels of said mining machine truck independently of the mining machine motor.

5. The combination with a mining machine truck adapted to carry a motor driven mining machine thereon, of a pony truck operatively connectible with said truck, and means on said pony truck for propelling the wheels of one or both of said trucks independently of the mining machine motor.

6. The combination with a mining machine truck adapted to carry a motor driven mining machine thereon, of a power truck operatively connectible with said truck, and means on said power truck for driving the wheels of both of said trucks independently of the mining machine motor.

7. The combination with a mining machine truck adapted to carry a motor driven mining machine thereon, of a pony power truck, and a flexible driving connection operatively connected between said pony truck and certain of the wheels of said mining machine truck.

8. The combination with a mining machine truck adapted to carry a motor driven mining machine thereon, of a pony truck, a motor thereon smaller than the mining machine motor, and operative connections between said pony truck motor and wheels of the mining machine truck.

9. The combination with a mining machine truck adapted to carry a motor driven mining machine thereon, of a pony truck operatively connectible with said truck, a motor on said pony truck smaller than the mining machine motor, and operative connections between said pony truck motor and wheels thereof.

10. The combination with a mining machine truck adapted to carry a motor driven mining machine thereon, of a pony truck operatively connectible with said truck, a motor on said pony truck smaller than the mining machine motor, and operative connections between said pony truck motor and wheels of each of said trucks.

11. The combination with a mining machine truck adapted to carry a motor driven mining machine thereon, of a pony truck, a truck wheel driving motor on said pony truck operatively connected to the wheels of said mining machine truck, and motive fluid supply means including a reeling mechanism on said pony truck.

12. The combination with a mining machine truck, of a pony motor truck for driving said truck or operating independently thereof, said pony truck having a driving connection with its wheels and the wheels of said mining machine truck, and current supply means including a cable reel carried on said pony truck.

13. The combination with a mining machine truck adapted to carry a motor driven mining machine thereon, of a pony motor truck for moving said truck or operating independently thereof, said pony truck having a driving connection with its wheels and the wheels of said mining machine truck, current supply means including a cable reel carried on said pony truck, and motor connecting conductors connected to said reel.

14. The combination with a truck adapted to carry a motor driven mining machine thereon, of a motor and reel carrying pony truck disposed in rear thereof, and motor driven means utilizing the weight of said mining machine to increase the traction and operatively connected to said pony truck for moving said mining machine truck along a trackway independently of the mining machine motor.

15. The combination with a truck for a motor driven mining machine, said truck having its wheels rotatable at all times independently of said machine, a pony truck, a motor on said truck smaller than the mining machine motor and driving the wheels of said trucks, and current supply means including a cable reel on said pony truck and motor connecting conductors operatively connected to said reel.

16. The combination with a mining machine truck adapted to carry a mining machine thereon, of a pony motor truck, means on said pony truck for traversing said first mentioned truck therewith along a trackway with a traction proportionate to the load on the mining machine truck, and means for maintaining a constant supply of motive fluid to said pony truck during its movement.

17. In a truck, a mining machine receiving and transporting element, a power element, a motor on said power element, driving connections between said motor and the wheels of said power element, and independent driving connections driven by said motor and connected to the wheels of said machine transporting element.

18. In a truck, a mining machine receiving and transporting element, a power element, a motor on said power element, driving connections between said motor and the wheels of said power element, and a driving connection operatively connected between said motor and the wheels of said machine transporting element, said connection including a flexible element.

19. In a truck, a machine transporting element, a power unit transporting element, electrical connections including a cable reel on said last mentioned element, a motor on said power element and operatively connected to said reel, and means connected to said motor for propelling said machine transporting element.

20. In a truck, a machine transporting element, a power unit transporting element, electrical connections including a conductor reel thereon, a motor thereon, propelling mechanism for said machine transporting element connected to said motor, and operative connections between said motor and said reel for driving the latter.

21. In a truck, a machine transporting element, a power unit transporting element, electrical connections including a conductor reel thereon, a motor thereon, operative connections between said motor and the wheels of each of said elements, and operative connections between said reel and a part rotated by said motor.

22. In a truck, a wheeled machine transporting element, wheel rotating mechanism therefor including a rotatable shaft disposed at the rear end thereof, an axle operatively connected with said shaft, a power unit transporting element, a motor on said element, and means for supplying rotation to said shaft from said motor including a flexible power shaft.

23. In a truck, a truck frame, wheels therefor, a motor on said truck frame, operative connections between said motor and said wheels, motive fluid connections including a reel on said truck frame, means forming driving connections between said wheels and said reel, a separate machine transporting element, and a driving connection between said motor and the wheels of said machine transporting element.

24. In combination, a wheeled mining machine truck, a mining machine on said truck, a wheeled power truck, a motor thereon, motive fluid connections including a reel connected to said motor and carried on one of said trucks, and means driven by said motor and driving the wheels of said mining machine truck for propelling said trucks along a trackway.

25. In combination, a wheeled mining machine truck, a mining machine on said truck, a wheeled power truck, a motor thereon, motive fluid connections including a reel operatively connected to said motor and carried on said power truck, means driven by said motor and driving the wheels of said mining machine truck for propelling said trucks along a trackway, and means for driving said power truck from said motor when disconnected from said mining machine truck.

26. In combination, a wheeled mining machine truck, a mining machine on said truck, a wheeled power truck, a motor thereon, motive fluid connections including a reel connected to said motor and carried on said power truck, means driven by said motor and operatively connected to the wheels of each of said trucks for propelling each of said trucks during movement along a trackway, and means for disconnecting said trucks.

In testimony whereof I affix my signature.

MORRIS P. HOLMES.